Oct. 13, 1959     F. R. L. DALEY, JR     2,908,351

DIFFERENTIAL LUBRICATION SYSTEM

Filed Sept. 9, 1955

INVENTOR
Frank R. L. Daley, Jr.
BY
L. J. Burek
ATTORNEY

United States Patent Office 2,908,351
Patented Oct. 13, 1959

2,908,351

DIFFERENTIAL LUBRICATION SYSTEM

Frank R. L. Daley, Jr., Fenton, Mich., assignor to General Motors Corporation, Detroit, Mich., a corporation of Delaware Application September 9, 1955, Serial No. 533,396

1 Claim. (Cl. 184—6)

This invention relates to lubrication systems in general and more particularly to lubrication systems for use with differential or other drive means employed with motor vehicles or the like.

Differential drive units used in automotive vehicles generally rely upon splash feed lubrication of their gears caused by the travel of the ring gear through lubricant retained in the differential sump. However, during high speed operation, the ring gear channels through the lubricant in the sump, collecting but slight lubricant and thus effecting appreciably little lubrication of the other gear members. The longer the vehicle is operated at high speeds, the longer the periods of dry run imposed upon the differential gear members.

In the past, the means proposed to supplement splash feed lubrication within drive means have been initially too expensive, difficult to install, inspect and repair, and generally have not proven satisfactory in operation.

It is now proposed to provide lubrication means for use with drive means which may be readily adapted for use with a minimum of effort, are simple and compact in arrangement including few parts, are inexpensive and are effective for their intended purpose.

It is proposed to provide an eccentric vane type pump which may be disposed about a drive shaft member, with the impeller keyed thereto, and with the pump housing secured to the support means through which the drive shaft normally extends. As adapted for use with a differential drive unit, the pump housing may be secured to the outside of the differential pedestal and within the protection of the axle shaft housing while still being readily accessible through the differential cover member or axle housing for inspection and repair.

Figure 1:
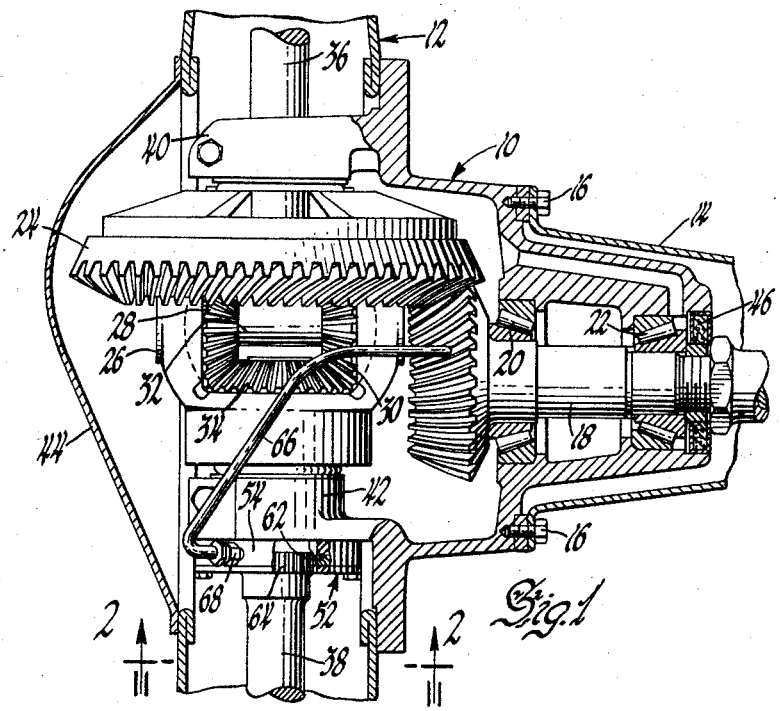
Figure 1 is a cross-sectional top view of a differential drive unit and axle housings of a motor vehicle showing the proposed lubrication system.
Figure 2:
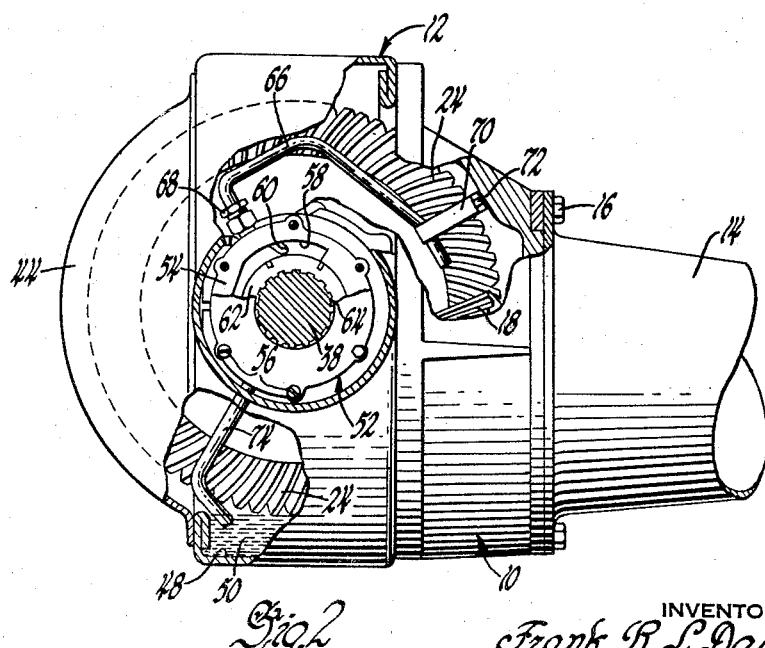
Figure 2 is a cross-sectional side view of the differential drive unit of Figure 1, including the proposed lubrication system, taken in the plane of line 2—2 of Figure 1 and looking in the direction of the arrows thereon.

The proposed lubrication system is shown and adapted for use with a differential drive unit. The differential unit includes the housing 10 having a banjo type axle housing 12 secured thereto in a conventional manner, not shown, and a torque tube drive shaft housing 14 secured thereto as by fastening means 16. A differential drive pinion 18 is journaled within pinion bearings 20 and 22 at one end of the differential housing 10. The pinion 18 meshes with and drives the ring gear 24 which includes the differential case 26. Differential pinion gears 28 and 30 are rotatable within the differential case 26 on the differential pinion shaft 32 and mesh with differential side gears, only one of which is shown, 34, secured to the ends of axle shafts 36 and 38. The axle shafts 36 and 38 are received through the pedestal forks 40 and 42 of the differential housing and are journaled therein within bearing means not here shown.

A cover member 44 is secured over the end of the axle housing 12 closing one end of the differential and the other end is closed by dirt seal means 46 for the protection of the pinion bearings 20 and 22.

Within the axle housing 12 and formed about the differential gear members, at the lowermost portion thereof and in the general vicinity of the differential, is provided a differential sump 48 within which a suitable lubricant 50 may be retained. The depth of the lubricant kept in the sump 48 is preferably sufficient to wet the lower part of the ring gear 24 so that rotation of the ring gear will pick up and throw off lubricant to provide splash feed lubrication for the differential gears within the differential unit.

During extended periods of high speed operation of the differential drive unit, when the differential and axle housing walls are covered with lubricant and the return flow of lubricant to the sump is slow, the depth of lubricant in the sump is inadequate to wet the ring gear as it passes therethrough. This taken with the tendency of the ring gear to channel through what lubricant it does reach endangers the differential gears by requiring that they operate at high speeds without sufficient lubricant to either reduce friction or cool the gears below temperatures which will cause damaging gear wear.

To supplement the splash feed lubrication just described, a fluid pump 52, preferably of the eccentric vane type here shown, is provided. The fluid pump 52 includes a pump body 54 concentrically disposed about one of the axle shafts 38 and secured to one of the differential pedestal forks 42, as by fastening means 56. The pump body is formed to provide a fluid chamber 58 having an inlet opening (not shown) and an outlet opening 60. An eccentric vane type impeller 62 is disposed within chamber 58 and is connected to the axle shaft 38 by splineways 64 provided upon the shaft.

A flow line or distribution conduit 66 is connected to the outlet side of the fluid pump 52, by coupling 68, and is extended to within the immediate vicinity of the gear teeth of the differential drive pinion 18. A hanger 70, secured to the inner wall of the differential housing 10 as by fastening means 72, assures proper positioning of the outlet end of conduit 66.

A suction line or feed conduit 74 is connected to the inlet side of pump 52, by any suitable means not shown, and extends down into the lubricant sump 48 below the lowermost level lubricant expected during high speed operation of the differential drive unit and spaced from the bottom of the sump to guard against drawing off sediment from the sump.

During normal operation of the differential drive unit, lubrication of the differential gears will be effected by splash feed caused by the ring gear's travel through the lubricant in sump 48 and by the forced feed of lubricant through pump means 52. During high speed operation of the differential drive unit when the level of lubricant in sump 48 is below that which can be reached by the ring gear 24, or when the speed of the ring gear and the level of lubricant available is such as causes the ring gear to skim over and channel through the lubricant it can reach, the fluid pump 52 continues to supply lubricant through conduit 66 to the drive pinion 18, will convey the lubricant to the ring gear 24, wetting the ring gear sufficiently to permit it to throw off sufficient excess lubricant to splash feed the other differential gears.

I claim:

A rear axle differential and gear reduction drive unit for use with motor vehicles and having in combination therewith splash lubrication means and forced feed lubrication means; said drive unit including a support member having the drive and differential gears of said drive unit mounted therein and axle shafts received and journaled in opposite sides thereof; said splash lubrication means including a source of lubricant retained within said drive unit, a ring gear mounted within said unit and disposed to pass through said lubricant for splash feed lubrication of members within said drive unit at normal vehicle operating speeds; said forced feed lubrication means including a pump housing mounted within said drive unit and having an impeller member operatively engaged with and driven by one of said axle shafts, means securing said pump housing to said support member of said drive unit and to said side thereof receiving said one axle shaft and outboard of said support member and disposed to receive said one axle shaft therethrough, splines formed about said one axle shaft for drive engagement with said pump impeller and ready disengagement therefrom, and lubricant supply passage means in communication with the inlet side of said pump housing and with said source of lubricant to a depth lower than said ring gear for assuring uninterrupted lubricant supply to said pump irrespective of inoperative splash feed lubrication as a consequence of said ring gear channeling and running dry through said lubricant.

References Cited in the file of this patent

UNITED STATES PATENTS

| | | |
|---|---|---|
| 1,176,936 | Waldon | Mar. 28, 1916 |
| 1,541,499 | Hinnekens | June 9, 1925 |
| 1,672,360 | Whitehead | June 5, 1928 |
| 1,921,769 | Morgan | Aug. 8, 1933 |
| 2,651,179 | Blood | Sept. 8, 1953 |
| 2,840,186 | Nyland | June 24, 1958 |

FOREIGN PATENTS

| | | |
|---|---|---|
| 647,332 | Germany | July 2, 1937 |
| 894,213 | France | Apr. 23, 1943 |